Dec. 19, 1961   R. M. ASHBY ETAL   3,014,214
CONICAL SCAN MONOPULSE RADAR SYSTEM
Filed June 27, 1957   5 Sheets-Sheet 1

INVENTORS.
ROBERT M. ASHBY
JAMES A. MARSH
BY

ATTORNEY

INVENTORS.
ROBERT M. ASHBY
JAMES A. MARSH
BY
ATTORNEY

INVENTORS.
ROBERT M. ASHBY
JAMES A. MARSH
BY
Frederic B. Schramm

ATTORNEY

Dec. 19, 1961     R. M. ASHBY ET AL     3,014,214
CONICAL SCAN MONOPULSE RADAR SYSTEM
Filed June 27, 1957                                   5 Sheets-Sheet 4

INVENTORS.
ROBERT M. ASHBY
JAMES A. MARSH
BY
*Frederic B. Schramm*

ATTORNEY

Dec. 19, 1961  R. M. ASHBY ETAL  3,014,214
CONICAL SCAN MONOPULSE RADAR SYSTEM
Filed June 27, 1957  5 Sheets-Sheet 5

INVENTORS.
ROBERT M. ASHBY
BY JAMES A MARSH

ATTORNEY

United States Patent Office 3,014,214
Patented Dec. 19, 1961

3,014,214
CONICAL SCAN MONOPULSE RADAR SYSTEM
Robert M. Ashby, Pasadena, and James A. Marsh, Whittier, Calif., assignors to North American Aviation, Inc.
Filed June 27, 1957, Ser. No. 668,431
10 Claims. (Cl. 343—11)

This invention relates to radar systems.

Highly directional radar antennas have been developed in the past which concentrate a substantial part of the transmitted radiant energy from a radar in a very small, highly directional beam. These antennas are usually used to obtain the range and bearing indications of a reflecting target with respect to the position of the transmitter-receiver. The transmitter and antenna direct pulses of radiant energy at the target. The radar set measures range by recording the time lapse between the transmission pulse and the reception of the echo. Conventional radar sets measure bearing by determining the angular position of the antenna at the time the echo is received.

Because of the highly directional characteristic of the transmitting and receiving antenna only those targets which are within a very small solid angle are detected by the radar set. Since the sensitive axis of the antenna must first be aligned with the line of sight to the target before any echo can be received, various scanning systems have been developed in the past to program scan the sensitive axis of the antenna over a large angular area in order to search. Most of these scanning systems involve the physical rotation of the reflector element of the antenna or antenna feed system about an axis. The physical rotation with a high degree of accuracy of such a reflector element, or feed, requires special balancing and torquing devices.

It is accordingly one of the objects of this invention to provide a scanning system without spinning antenna reflector, or feed, elements.

In my co-pending application, Serial No. 607,516, filed August 31, 1956, I have described a conical scanning system employing a four-horn emitter. My present object is to accomplish conical scanning from a two-horn feed bridge.

Further objects of the invention are to accomplish conical scan transmission in an improved manner as well as permitting transmission or reception of error track monopulse signals and reception of conical range signals.

Other and further objects, features and advantages of the invention will become apparent as the description proceeds.

In carrying out the invention in accordance with a preferred form thereof, a microwave transmitter is provided capable of generating energy of a frequency transmissible through waveguides. Two waveguide channels from the transmitter are provided, one feeding a range or sum channel and the other a direction or error track channel. An antenna of the parabolic reflector type is employed, arranged for illumination by a two-horn feed bridge with provisions for extracting tracking error signals in two orthogonal planes, that is azimuth and elevation, as well as extracting range signals for monopulse radar operation.

The feed consists of two horns located in the vicinity of the focal point of the reflector. The centers of these horns are located on a line which makes an angle of 45° with both the elevation and azimuth axes. The two feed horns are of the J type for excitation by a center rear feed technique with waveguides tending to isolate one horn from the other, so that one horn illuminates the portion of the reflector to the left of the waveguides, whereas the other horn illuminates the portion of the reflector to the right of the waveguides. The isolation provided by these waveguides is sufficient to cause a fairly large separation in terms of a wave length of the centers of phase of the two halves of the antenna, each more or less separately excited by one of the two feed horns.

A duplexer is interposed in the range channel consisting of a pair of side slot couplers with a pair of receiver protection tubes commonly known as transmit-receive or TR tubes interposed between the two side slot couplers. A range receiver is connected to the signal outlet port of the duplexer. A similar duplexer with an error receiver connected to the signal outlet port is interposed in the error channel. In addition, a continuous phase shifter is interposed in the error channel between the duplexer and the transmitter.

The proper combination of transmitted signal phase and amplitudes in the range and error channels produces conical scanning of the radiated energy.

The duplexers prevent the direct passage of energy from the transmitter to the receivers while permitting reflected energy received by the antenna to be directed to the range and error receivers in accordance with the monopulse system instead of the conical scan system.

This system accordingly provides a conical scan radiated antenna beam for locating a target. The same apparatus serves also for tracking the target by the highly precise monopulse system.

A better understanding of the invention will be afforded by the following detailed description considered in conjunction with the accompanying drawings, in which FIG. 1 is a plan view of a two horn feed device mounted in a fragmentarily shown reflector for a radar tracking system;

Like reference characters are utilized throughout the drawing to designate like parts.

Figure 2:
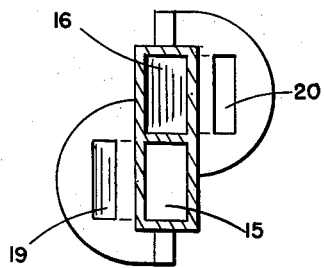
FIG. 2 is a cross-sectional view of the device of FIG. 1 represented as cut by a plane 2—2', as seen looking in the direction of the arrows indicated on FIG. 1.
Figure 3:
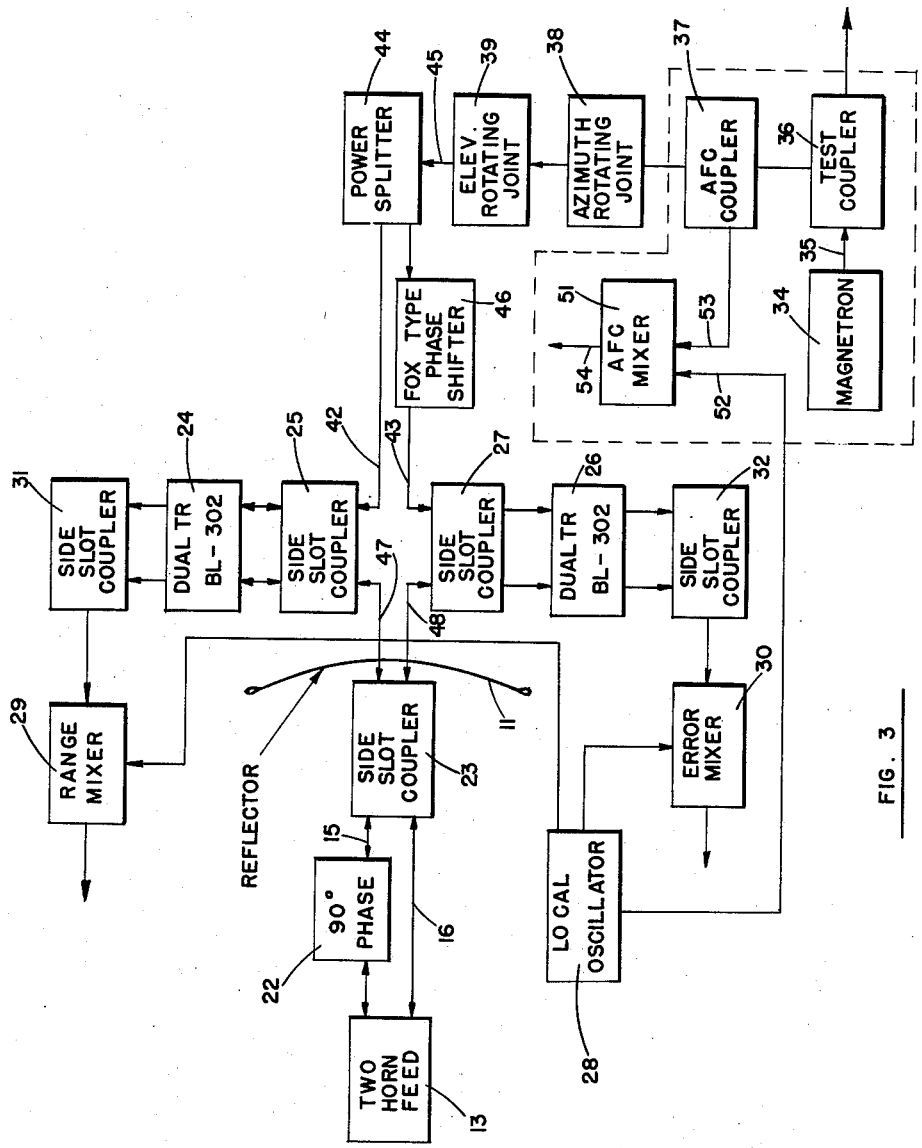
FIG. 3 is a block diagram of the microwave portions of the radar system employing the two-horn feed device of FIG. 1.
Figure 8:
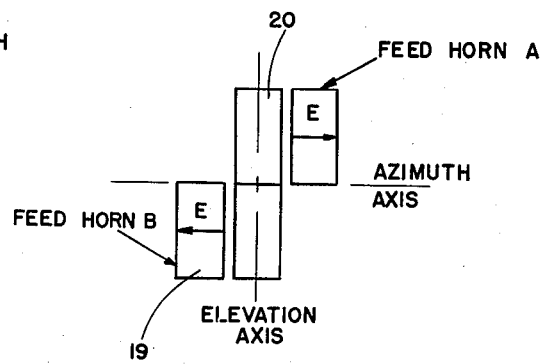
FIG. 8 is a schematic diagram representing the positional relationship between the waveguides and the horns of the apparatus of FIGS. 1 and 2.

As illustrated in FIG. 3, a system is employed comprising a schematically represented parabolic reflector 11 having a center opening 12 (FIG. 1) in which the base 14 of a two-horn feed device 13 is mounted for illuminating the reflector 11. As shown more clearly in FIG. 2, the two-horn feed device 13 comprises a pair of adjacent, rectangular cross section, center waveguides 15 and 16 secured to the base 14 for electrical connection to waveguides (not shown in FIG. 1) represented schematically by lines 16 and 17 in FIG. 3. The ends of the waveguides 15 and 16 are turned in J form with elbows 17 and 18, the open ends of which form feed horns 19 and 20. As illustrated in FIG. 8, the feed horns 19 and 20 are located with their centers on a line which makes an angle of 45° with both the elevation and azimuth axes and the arrangement is such that the horns are in the vicinity of the focal point of the parabolic reflector 11.

Figure 1:
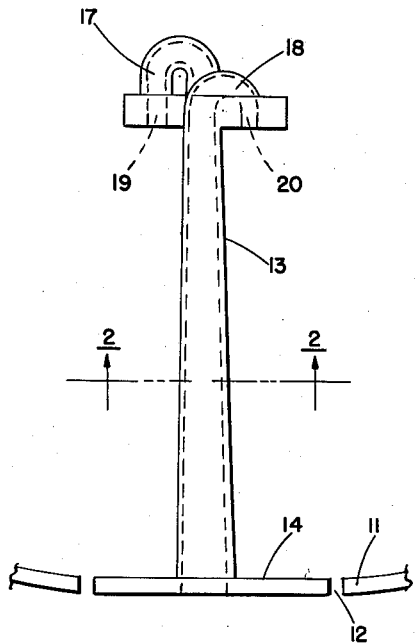

In order to allow for separation of range and error information contained in the energy received through the waveguides 15 and 16, a 90° phase shifter 22 is provided which actually consists of additional length of waveguide in the elbow 17 as illustrated in FIG. 1. For separating received range and error-track energy in monopulse operation, a hybrid bridge 23 is interposed in the waveguides 15 and 16 and a pair of duplexers is provided. The hybrid bridge 23 may take the form of a side slot coupler. One duplexer comprises a dual TR tube 24 and two side slot couplers 25 and 31, whereas the other duplexer comprises a dual TR tube 26 and two side slot couplers 27 and 32. For employing the superheterodyne principle of reception, a local oscillator 28 is provided with a range mixer 29 and an error track mixer 30 having input channels from the local oscillator 28 and also receiving inputs from the duplexer through side slot couplers 31 and 32.

For producing the transmitted wave for use in the radar system a suitable oscillator such as a magnetron 34 is provided. From the magnetron 34 there is channel 35 through a test coupler 36, an automatic frequency control coupler 37, conventional azimuth and elevation rotating joints 38 and 39, and a waveguide 45 into a power splitter 44.

Figure 7:
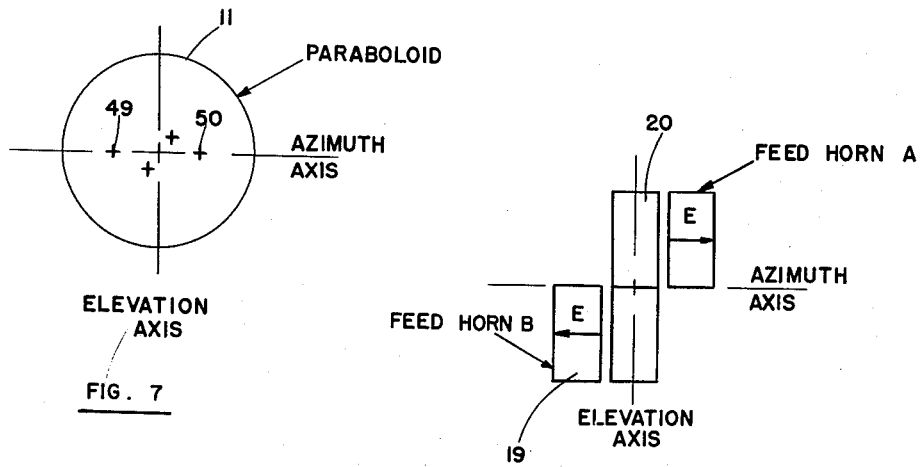
FIG. 7 is a diagram representing the effective phase center relationship between the energy illuminating the parabolic reflector.

The power splitter 44 may be of the side slot coupler type. It may be also one of the types described in volume IX of the Massachusetts Institute of Technology Radiation Laboratory Series: Microwave Transmission Circuits, Sections 8.19, 8.20 and 8.22 on pages 522–528, 533–536 under the headings Waveguide Power Dividers and Switches. The power splitter 44 has two output channels 42 and 43, in one of which a Fox type phase shifter 46, is introduced. Channels 42 and 43 supply energy to range and error channel waveguides 47 and 48. The power splitter 44 and phase shifter 46 control amplitude and phase relations of the energy in the range and error channel waveguides 47 and 48 to produce conical scan transmitted radiation. By controlling the power splitter 44, all of the energy may be transmitted in the range channel 47 as in a conventional monopulse system. The continuous phase shifter 46 may be of the Fox type comprising a rotatable section of a round waveguide containing a 180° phase shift delta section. The phase shifter 46 may, for example, be of the type described in the copending application of Robert M. Ashby, Serial No. 606,909, filed August 29, 1956, referring particularly to FIGS. 3 and 7, showing rotatable phase shifting delta sections.

The side slot coupler 23 may be a coupler of the Riblett type.

Signals arriving at the antenna from directly on axis will excite equal amplitude, in phase components in the two feed horns 19 and 20. However, due to the presence of the fixed 90° phase shift 22 in one of the feed horn waveguides, the inputs to the side slot coupler 23 in the feed section will be equal in amplitude but in phase quadrature. Owing to the inherent 90° phase shift of signals coupling through the side slot coupler, all of the energy will be transmitted into the range channel 47.

Deviation from axis in elevation will result in an excitation of the two horns 19 and 20 with signals of unequal amplitude and negligible phase difference due to the opposite offsets of the antenna patterns of each feed horn. Since the signals now impressed on the side slot coupler are unequal in amplitude, a component will result in the error channel the magnitude of which is proportional to the amount of deviation off axis in elevation. The sense of this deviation may be obtained by a comparison of the phase of the elevation error signal with the range channel signal.

It will be observed that in the azimuth plane, the feed waveguides 15 and 16 shield each half of the parabolic reflector 11 from opposite horn illumination. This configuration results in two antenna patterns the amplitude distributions of which are almost identical but having phase centers displaced by approximately half the width of the parabola as illustrated by the points 49 and 50 of the schematic diagram of FIG. 7. For deviations from the axis in the azimuth plane, signals are excited at the two feed horns which are essentially equal in amplitude but differ in phase, depending upon the amount of azimuth deviation. Since the signals are now impressed on the side slot coupler equally in amplitude but at some relative phase angle, a signal will again result in the error track channel 48. The amount of this signal will be proportional to the amount of azimuth deviation and the sense of the azimuth deviation can again be obtained by comparison of the error channel and range channel phases.

Figure 4:
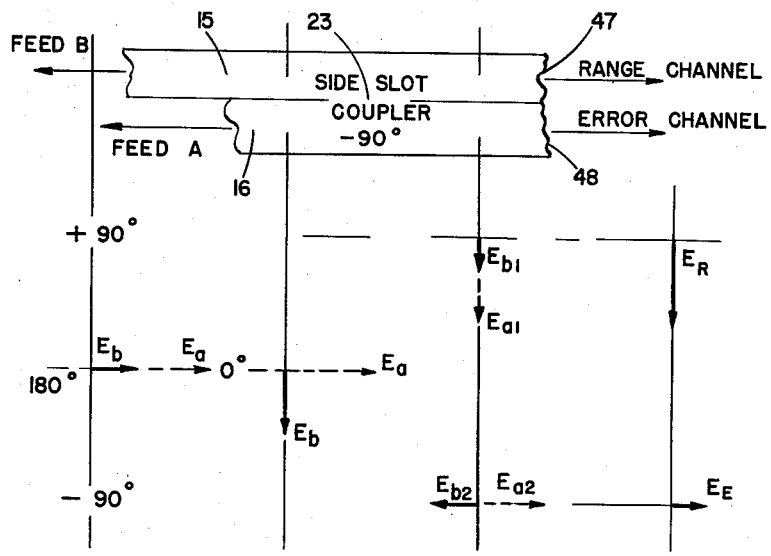
FIG. 4 is a diagram illustrating the principle of operation by which various feed excitations are separated into range and error channels.
Figure 5:
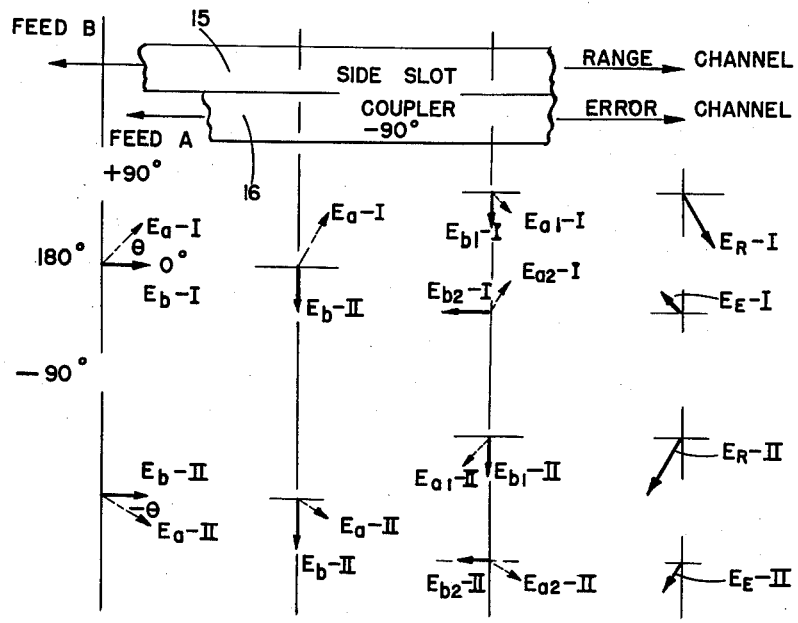
FIG. 5 is a corresponding diagram illustrating the conditions with a different phase relationship.
Figure 6:
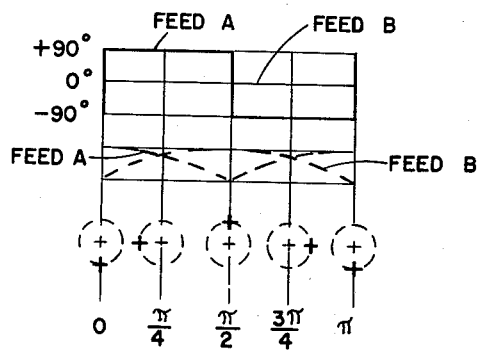
FIG. 6 is a diagram illustrating the phase relationship between the energy in the feed horns at successive instants of time within a cycle of phase variation during conical scan.

The manner of indication of relative phase is illustrated by the diagrams of FIGS. 4 and 5. Fig. 4 illustrates the condition when the two horns of the feed are excited unequally but in phase. The inputs to the side slot coupler 23 and the range and elevation channel components are as shown. The vectors representing the energy in waveguides 16 and 15 are designated by the reference characters $E_a$ and $E_b$. Since $E_a$ is either larger or smaller than $E_b$, depending upon the direction of the elevation error, the resultant elevation error signal $E_e$ is either leading or lagging the range signal $E_r$ by 90°. $E_r$ is the resultant of $E_{b1}$ component of $E_b$ continuing through the range channel 15, and $E_{a1}$, the component of $E_a$ transferred through the side slot coupler 23 to the range channel 15. $E_e$ is likewise the resultant of $E_{b2}$ the component of $E_b$ transferred through the side slot coupler 23 to the error channel 16, and $E_{a2}$ the component of $E_a$ continuing through the error channel 16.

Referring to FIG. 5, the inputs to the feed and side slot couplers for azimuth deviation from the axis are shown. This also results in components in the range and error channels as indicated. Depending upon the sign of the phase angle $\theta$, the azimuth error signal is either in phase or 180° out of phase with the range channel signal; hence the azimuth and elevation error signal are in phase quadrature in the same error channel . This permits ready separation of azimuth and elevation error signals in the receiver as readily understood by those skilled in the art.

Consequently only two receivers are required.

In FIG. 5, $E_a$–I and $E_b$–I are the vectors representing input to the waveguides 16 and 15, respectively, when the phase angle $\theta$ is positive; $E_a$–II and $E_b$–II are the corresponding vectors when the phase angle $\theta$ is negative.

$E_{a1}$–I and $E_{b1}$–I are the components supplied to the range channel, and $E_{b2}$–I and $E_{a2}$–I the components supplied to the elevation channel, for positive phase angle $\theta$. $E_r$–I and $E_e$–I are the resultants for positive value of $\theta$.

For negative values of the phase angle $\theta$, the corresponding vectors are $E_{a1}$–II and $E_{b1}$–II, $E_{b2}$–II and $E_{a2}$–II and the resultants $E_r$–II and $E_e$–II. Whether the phase angle $\theta$ is positive or negative is revealed by whether the resultant in the error channel for azimuth error is in or out of phase with the resultant in the range channel.

The arrangement illustrated avoids the mechanical complexity and numerous moving parts of physically rotating reflectors or feed arrangements. There is only the simple mechanical rotation involved in the Fox type phase shifter 46. The simplified microwave assembly illustrated therefore, accomplishes monopulse operation with reduced complexity of fabrication and maintenance, improved performance and greater accessibility of components.

In order that a constant intermediate frequency will be obtained for use in the receivers connected to the range and error mixers 29 and 30, an automatic frequency control mixer 51 may be provided having input channels 52 and 53 from the local oscillator 28 and the automatic frequency control coupler 37, respectively, with an output channel 54 connected to suitable means as will be understood by those skilled in the art for adjusting the frequency of the local oscillator 28 to correspond to any possible fluctuation in frequency of the magnetron 34.

The dual TR tubes 24 and 26 preferably have built-in shutters for crystal protection. The arrangement permits mounting the local oscillator 28 together with the duplexers including the TR tubes 24 and 26, the side slot couplers 25 and 27, 31 and 32 and the mixers 29 and 30 upon the scanner assembly including the reflector 11.

The conical scanning of the transmitted beam takes place at a rate determined by the change of phase shift in the channel 43 produced by the Fox type phase shifter 46. The arrangement illustrated allows for transmission of such a conical scanning beam while retaining the inherent accuracy of monopulse tracking.

Figure 9:
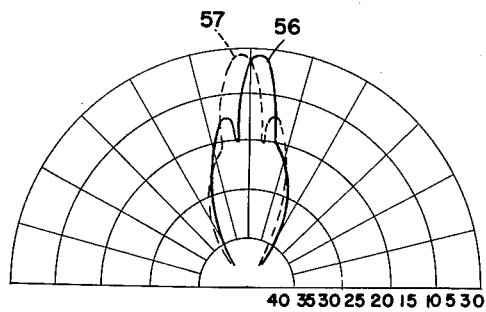
FIG. 9 is a polar graph illustrating the distribution of transmitted energy in the range channel for two times during the conical scan cycle.

Referring to FIG. 9, the full line curve 56 represents the range signal energy beam in one position and the dotted line curve 57 represents a position of this conically scanning beam 180° from that represented by curve 56.

Figure 10:
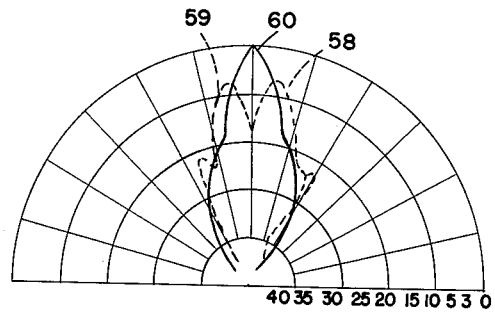
FIG. 10 is a polar graph illustrating the monopulse range and error reception patterns.

In FIG. 10 the dash line curves 58 and 59 represent for either the azimuth plane or the elevation plane relative response in the error channel to signals or reflections plotted according to angles from the axis of the reflector 11. The full line curve 60 represents the response in the range channel to reflections from the located object plotted according to deviation angle of the object from the axis of the reflector 11.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A radiant energy system comprising in combination a reflector, a two horn feed therefor, a transmitter, a pair of output channels coupled to said transmitter, a side slot coupler coupling the two horn feed to said output channels with 90° phase shift interposed in one of the channels, duplexers interposed in each of the channels, range receiver output for one of the duplexers, error receiver output for the other duplexer, and a continuous phase shifter interposed in one of said transmitter channels.

2. A radiant energy system comprising in combination a power oscillator, a local oscillator, a mixer responsive to said oscillators, said local oscillator having frequency control, said mixer having output responsive to said local oscillator for adjusting frequency to maintain a predetermined relationship between power oscillator and local oscillator frequencies, a power splitter connected to said power oscillator to receive energy thereof, a pair of channels connected to said power splitter, one of said channels having a continuously variable phase shifter interposed therein, a reflector, a two horn feed, a side slot coupler coupling said channels to said two horn feed, one of said channels having 90° phase shift interposed therein, said two horn feed being mounted asymmetrically with respect to the reflector, and duplexers interposed in the channels with separate receiver outputs, whereby conical scan is obtained with respect to transmission and monopulse scan with respect to reception from said reflector.

3. A reflector, first means for feeding energy to the reflector, second means for feeding energy to the reflector with a different phase, the centers of said first and second means being located on a line which forms a substantially 45 degree angle with predetermined mutually perpendicular azimuth and elevation axes, and a continuous phase shifter interposed in one of said means for effecting conical scan.

4. The radiant energy system comprising in combination a power oscillator, a local oscillator, a mixer responsive to said oscillators, said local oscillator having frequency control, said mixer having output responsive to said local oscillator for adjusting oscillator frequency to maintain a predetermined relationship between power oscillator and local oscillator frequencies, a pair of power channels connected to said power oscillator, a reflector with a two-horn feed and a side slot coupler coupling said power channels to said two-horn feed, said two-horn feed being mounted asymmetrically with respect to the reflector, duplexers interposed in the channels with separate receiver outputs whereby range and tracking error signals may be obtained from the reflector.

5. A radiant energy system comprising in combination a reflector, a two horn feed device therefor, the centers of each horn of said feed device being located on a line which forms an angle of substantially 45 degrees with the azimuth and elevation axes of said system, a transmitter, a pair of output channels coupling the transmitter to the reflector feed device, one of said channels having a fixed delay therein, and a continuously variable phase-shifter being interposed in one of said channels.

6. A radiant energy system comprising in combination a reflector, a two-horn feed device therefor having a hybrid bridge therein, a transmitter, a pair of output channels coupling the transmitter to the reflector feed device and a continuously variable phase shifter interposed in one of said channels.

7. A radiant energy system comprising in combination a reflector, a dual feed device therefor having a pair of displaced phase centers, a transmitter, a pair of output channels coupling the transmitter to the reflector feed device and a continuously variable phase shifter interposed in one of said channels.

8. A radiant energy system comprising in combination a transmitter, first and second channels coupled to said transmitter, a continuous phase shifter interposed in one of said channels, a side slot coupler having input ports connected to said first and second channels, a pair of waveguide sections each separately connected to said side slot coupler, one of said waveguide sections having a 90° phase shift as compared with the other of said sections, a pair of feed horns, each of said horns connected to a separate one of said waveguide sections, and a reflector, each of said horns being positioned to illuminate a separate half of said reflector.

9. A radiant energy system comprising in combination a transmitter, first and second channels coupled to said transmitter, one of said channels having a continuous phase shifter interposed therein, a side slot coupler connected to receive the outputs of said channels, a reflector, and two horn feed means connected to said side slot coupler for coupling the output of said coupler to said reflector with a 90° phase shift in one of said feed means as compared with the other of said feed means, each of said feed horn means being positioned to illuminate a separate half of said reflector.

10. In a radiant energy system in combination, a reflector, a pair of feed horns mounted in the vicinity of the focal point of said reflector, the centers of said horns being located on a line which forms a substantially 45-degree angle with both the elevation and azimuth axes of the system, a pair of waveguide channels coupled to said pair of feed horns, one of said channels having an effectively one-fourth wavelength longer transmission path than the other of said channels, and continuous phase shift means interposed in one of said channels for effecting conical scan.

References Cited in the file of this patent

UNITED STATES PATENTS

| | | |
|---|---|---|
| 2,513,498 | Lawson | July 14, 1950 |
| 2,784,403 | Marsh et al. | Mar. 5, 1957 |
| 2,817,835 | Worthington | Dec. 24, 1957 |
| 2,824,305 | Ohlemacher | Feb. 18, 1958 |